Patented July 22, 1941

2,250,232

UNITED STATES PATENT OFFICE 2,250,232

RUBBER CHLORIDE COMPOSITION

Clayton Olin North, deceased, late of Charleston, W. Va., by Margaret R. North, administratrix, Charleston, W. Va., assignor to The Raolin Corporation, Charleston, W. Va., a corporation of West Virginia No Drawing. Original application February 5, 1936, Serial No. 62,547. Divided and this application July 7, 1938, Serial No. 218,020

8 Claims. (Cl. 260—735)

This invention relates to rubber chloride compositions, and it comprises rubber chloride varnishes, lacquers, enamels and like compositions, composed principally of rubber chloride and a plasticizer therefor, and usually solvents or other vehicles for the rubber chloride and plasticizer; the plasticizer being advantageously an ester containing an ether group or a halogen atom, or both, such as an ether ester or an ester of dichlorhydrin, and being a solvent for rubber chloride and miscible in all proportions therewith; and it comprises methods of making such compositions; all as more fully hereinafter set forth and as claimed.

This application is a division of application, Serial No. 62,547, filed February 5, 1936 (now Patent No. 2,148,830).

In said application, Serial No. 62,547, there is described an improved method of making rubber chloride, wherein a non-aqueous solution of rubber is boiled under a reflux open to the atmosphere to reduce the viscosity of the solution and to eliminate moisture therefrom. After prolonged boiling—usually for several hours—the viscosity reaches a minimum, and water is substantially completely removed from the system. At this stage the rubber is ready for chlorination, which may be effected in the same or some other suitable vessel. Chlorination is most conveniently accomplished by bubbling gaseous chlorine through the solution until it is no longer completely taken up. Yellow fumes of chlorine then appear above the solution, or in the effluent from the condenser.

The chlorinated solution contains some uncombined chlorine, and hydrochloric acid which is formed as an incident to chlorination. In chlorination, part of the chlorine is directly added to the rubber molecule, and part of it goes in by substitution, forming hydrochloric acid as a side product. This acid and excess chlorine may be largely eliminated by continuing to heat the solution after the supply of chlorine is cut off, but some further step is often necessary to obtain a sufficiently neutral solution. For example, as described in the parent application, finely divided lime may be added and agitated with the solution, with or without further heating. The lime and the salts formed by its reaction with the hydrochloric acid are insoluble in the organic solution of rubber chloride, and may be readily separated by decantation, filtration or the like.

The solution of rubber chloride may then be treated in any desired manner to recover the pure rubber chloride therefrom. For example, the rubber chloride may be separated from the solvent—usually carbon tetrachloride—by adding hot water, or an alcohol, or a petroleum fraction, or other suitable non-solvent for rubber chloride, to the solution. This separates the rubber chloride, and it may be readily removed and dried.

The dry rubber chloride thus obtained is applicable for all the ordinary and known uses of rubber chloride. Among other things, it can be dissolved in appropriate solvents to give coating compositions. Rubber chloride is soluble in but few liquids, a fact to which it owes much of its value as a coating material in varnishes and the like. The liquids in which it is soluble include carbon tetrachloride, chlorinated ethanes and some other chlorinated hydrocarbons, and various coal tar oils such as benzol, toluol, xylol and the like. These coal tar oils are the usual solvents in making varnishes, lacquers and enamels. Such varnishes do not tolerate any great amount of thinner of a petroleum nature, such as "turpentine substitute," etc., but minor amounts may be used.

Rubber chloride itself being a friable brittle solid, it is usual to add a plasticizer of some type to varnish solutions made therefrom in order to obviate brittleness in the varnish film. In making a coating composition which readily dries to a non-brittle condition, and forms a more or less flexible, non-brittle film, it is somewhat difficult to also obtain a continuous film of rubber chloride in which the inert and chemically resistant character of the chloride is fully utilized. It is often the case that the rubber chloride remains in the final dried film as a dispersoid; as a sort of filler in a continuum of something else. This is the case in making varnishes with rubber chloride and tung oil. Excellent varnishes can be so made, but they are no more resistant than a film of tung oil without the rubber chloride.

There is much room for choice in plasticizers. Many of those now in use with rubber chloride, like tung oil, are good softening agents, compatible with the various varnish constituents, but the products obtained are really mixed films, heterophase in character. To obtain the valuable properties of rubber chloride to the fullest extent, the plasticizer must be one which is capable of dissolving or blending with rubber chloride; of forming a homogenous single phase union therewith. Some of the commercial plasticizers are simply not miscible with rubber chloride.

some are miscible but with difficulty and in but limited amount, and others are freely miscible. Tricresyl phosphate, which is often used, belongs to the second class. In the usual mixtures and under the usual conditions, it does not go into unitary union with the rubber chloride. The tendency is to make a 2-phase system.

It is found that certain particular types of plasticizers miscible with rubber chloride are advantageous in making varnishes and other coating compositions. They are also useful in making plastic compositions. Plasticizers of this type may be generically called solvent plasticizers, and this invention contemplates the use of plasticizers of this type.

Solvent plasticizers of the type here contemplated are capable of dissolving rubber chloride to a liquid, if used in major amounts, producing solutions mobile at ordinary, or slightly elevated, temperatures and with a viscosity depending upon that of the plasticizer. Commonly, however, and in the present invention, there should be used smaller amounts of the solvent plasticizer; minor amounts which are sufficient to render the dried coating non-brittle, the amount and type of solvent plasticizer being varied to obtain coatings more or less flexible as may be desired.

Ordinarily, it is sufficient in making such improved coating compositions to add to the varnish (solution of rubber chloride) between 2 and 10 per cent of the selected solvent plasticizer. The amount varies somewhat with the particular plasticizer and the particular character of film desired. The varnishes then yield coatings which dry and set rapidly to non-brittle films. The rubber chloride content of the varnishes is variable and depends on the amount of other ingredients used, if any. For purposes of calculation, the amount of added solvent plasticizer may be referred to the rubber chloride itself. Generally, 5 to 30 per cent (by weight) of solvent plasticizer on the rubber chloride will obviate brittleness and give a desirable type of flexibility to the coating in the absence of other ingredients having a softening effect.

The solvent plasticizers added in the present invention are liquids or low melting solids permanent in the air and without substantial vapor tension at ordinary temperatures. They should be sufficiently non-volatile to remain in the dried coating in full amount for an indefinitely long period when exposed to air. They should also be soluble in or miscible with the thinners or solvents employed in making rubber chloride varnishes.

It was found that the mono- and di-esters which have a relatively high molecular weight and which contain, in addition to one ester group, certain other groups are advantageous solvent plasticizers for the present purposes. Those which contain halogen atoms or ether groups are particularly advantageous. Such esters may be obtained by esterifying various mono and dibasic acids, either of the aliphatic or aromatic series, with suitable monohydric aliphatic alcohols. Various alcohols may be used. It is advantageous that the solvent plasticizer contain not more than two ester groups, since tri-esters have relatively little solvent power for rubber chloride. For instance, fatty oils which are tri-esters (glycerides) are not solvent plasticizers. On the other hand, it was found that the mono- and di-esters do have solvent action upon rubber chloride and this solvent action is increased as chlorine atoms or ether groups are introduced into the ester. For instance, methyl palmitate is a solvent plasticizer of only fair power, whereas the palmitate of the ethyl ether of ethylene glycol is a much stronger plasticizer.

Generally, the esters of aliphatic carboxylic acids are useful, provided the hydrocarbon chains in the ester are sufficient to give a relatively high molecular weight and boiling point to the compound. Aromatic carboxylic acids give useful esters with alcohols containing a substituent halogen atom.

Of many classes of ester compounds which may be employed as solvent plasticizers, the classes given post are particularly advantageous.

I. *Esters of glycerin dichlorhydrin*

The mono- and di-esters of this class may be respectively represented by the following formulae:

(a)
$$X-\overset{H_2}{\underset{}{C}}-\overset{H}{\underset{O}{C}}-\overset{H_2}{\underset{}{C}}-X$$
$$R-C=O$$

(b)
$$\begin{array}{cc} H_2=C-X & X-C=H_2 \\ H-C-O-C-R-C-O-C-H \\ H_2=C-X \quad O \quad\quad O \quad X-C=H_2 \end{array}$$

wherein R represents an alkyl, aralkyl or aryl group and X is a halogen atom.

Such esters may be obtained by condensing 1:3 glycerin dichlorhydrin with an acid chloride. The acid chlorides of mono- and di-carboxylic acids, aliphatic or aromatic, may be employed. Aliphatic acids, either unsaturated or saturated, as acid chlorides, may be condensed with a dichlor-aliphatic mono-alcohol. Acid chlorides of benzoic and phthalic acids are illustrative. Esters obtained from them with 1:3 glycerin dichlorhydrin have respectively the following formulae

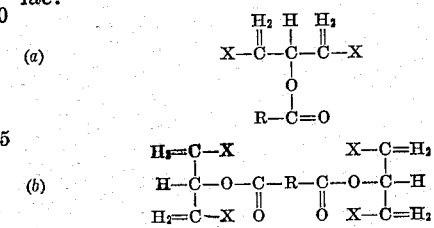

(1:3 dichlorhydrin benzoate)

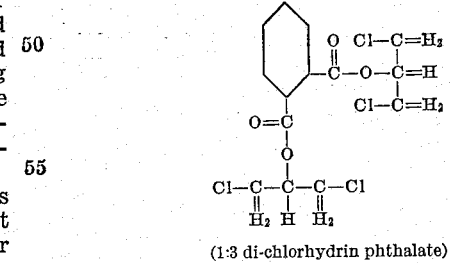

(1:3 di-chlorhydrin phthalate)

The esters of 1:3 di-chlorhydrin with the following aliphatic acids are advantageous:

A. Saturated aliphatic acids
1. Mono-basic
   Lauric
   Myristic
   Caproic
   Palmitic
   Stearic Formula: $H_3C-(CH_2)_x-CH_2-COOH$
$x=2$ to 16

The formulas given correspond to all of the acids listed opposite them.

2. Di-basic
   Succinic
   Glutaric
   Adipic

Formula: $HOOC-(CH_2)_x-COOH$
$x=2$ to 6

B. Unsaturated aliphatic acids

1. Mono-basic

Acrylic
Allyl acetic
Undecylenic $H_2C=CH-(CH_2)_x-COOH$ $x=0$ to 8

Crotonic
Methyl crotonic
Nonylenic $H_3C-(CH_2)_x-\underset{H}{\overset{H}{\underset{|}{C}}}=\underset{|}{\overset{|}{C}}-COOH$ $x=0$ to 5

Crotonic
Ethidine acetic
Butylidine acetic
Ethidine propionic hexenic
Propylidene-propionic
Teracrylic
Decylenic $H_3C-(CH_2)_x-\overset{H}{\underset{|}{C}}=\overset{H}{\underset{|}{C}}-(CH_2)_x-COOH$ $x=0$ to 16

Hypogaeic
Oleic
The unsaturated fatty acids of sperm oil $H_3C-CH_2-(CH_2)_x-CH_2-\overset{}{\underset{}{C}}H$
$\qquad\qquad\qquad\qquad\qquad\qquad \parallel$
$HOOC-CH_2-(CH_2)_x-CH_2-\overset{}{\underset{}{C}}H$ $x=$at least 1

2. Di-basic

Fumaric
Maleic
Glutaconic $HOOC-(CH_2)_x-\overset{H}{\underset{|}{C}}=\overset{H}{\underset{|}{C}}-(CH_2)_x-COOH$ $x=0$ to 4

Also, any of the aliphatic acids may be esterified with ether-mono-hydric aliphatic alcohols to form esters which are useful as solvent plasticizers for rubber chloride. The saturated and unsaturated monocarboxylic aliphatic acids yield esters which are advantageous. This class is the second major class of solvent plasticizers.

II. *Aliphatic esters of ether-alcohols*

These esters may be represented by the following formula:

$H_3C-(CH_2)_x-O-[-(CH_2)_x-O-]_m-(CH_2)_x-O-\underset{\overset{\parallel}{O}}{C}-R_1$ wherein $x$ is at least 1, $m$ is 0 to 2 and $R_1$ may be a group of the following types:

(a) $\qquad -CH_2-(CH_2)_x-CH_3$ wherein $x$ is 1 to 15;

(b) $\quad -(CH_2)_x-CH_2-\overset{H}{\underset{|}{C}}=\overset{H}{\underset{|}{C}}-CH_2-(CH_2)_x-CH_3$ wherein $x$ is 0 to 8.

The mono-ether esters may be obtained from the alkyl ethers of ethylene glycol. The di- and tri-ether esters are formed respectively from 1. $\qquad R_2-O-R_2-O-CH_2-CH_2-OH$ and 2. $\qquad R_2-O-R_2-O-R_2-O-CH_2-CH_2-OH$;

wherein $R_2$ is an alkyl group.

The esters obtained from the methyl, ethyl, butyl, ethoxy-ethyl, butoxy-ethyl and butoxy-ethoxy-ethyl ethers of ethylene glycol are advantageous.

In United States Patent No. 2,010,560, there are disclosed methods of preparing such ether esters; for instance, the oleates of the mono-, di- and tri-ether ethylene glycols, such as the alkyl ethers of ethanol and the alkoxy-alkyl ethers of ethanol.

The oleates, palmitates and stearates of the above mentioned ether alcohols are advantageous, particularly those in which the alcohol component is $-O-CH_2-CH_2-O-(CH_2)_m-CH_3$ wherein $m$ is 0 to 3. The following compounds and their structural formulae are illustrative:

Butyl ether of ethylene glycol stearate $H_3C-(CH_2)_2-CH_2-O-CH_2-CH_2-O-\underset{\overset{\parallel}{O}}{C}-CH_2-(CH_2)_{14}-CH_2CH_3$ Methyl ether of ethylene glycol palmitate.

$H_3C-O-CH_2-CH_2-O-\underset{\overset{\parallel}{O}}{C}-CH_2-(CH_2)_{12}-CH_2-CH_3$ Methyl ether of ethylene glycol oleate

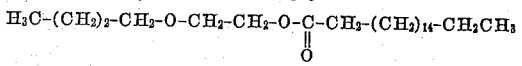

Ethyl ether of ethylene glycol oleate,

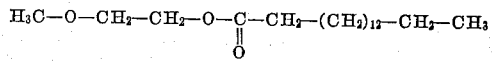

Ethyl ether of ethylene glycol acetyl-ricinoleate

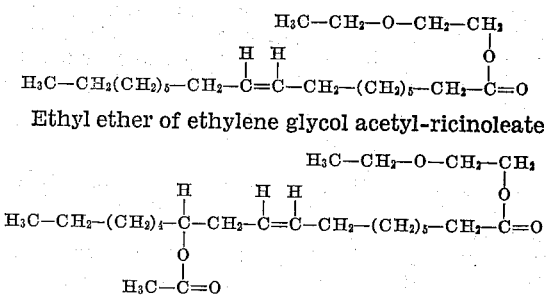

The esters of ricinoleic acid, in which the hydroxy group of that acid is esterified or the double bond thereof is saturated with chlorine or HCl, are generally useful here. That is, in addition to the acetylated ricinoleic acid, the hydrochloride or di-chloride of ricinoleic acid may be employed to prepare suitable esters which are solvent plasticizers. For instance, methyl chlor-ricinoleate has substantial solvent power for rubber chloride. That is, some of the esters of simple alcohols, such as methyl, ethyl, etc., are also useful for the present purposes. Methyl and ethyl palmitates have sufficient solvent power for rubber chloride to render their addition to the varnish worth while in some cases. However, as stated ante, the esters which contain an ether group or halogen atom in addition to the ester group, are ordinarily employed; they having marked solvent action on rubber chloride.

As a general rule, esters containing one or more chlorine atoms, either on the acid side or on the alcohol side, are better solvent plasticizers than the same type of compound without the chlorine. An ester of glycerin dichlorhydrin is also an ester of dichlor-propane, which is itself an excellent solvent for rubber chloride. The presence of ring groups on either side of an ester also aids miscibility.

The following example is illustrative of one liquid composition:

*Example 1*

Into a suitable container equipped with agitating means are introduced 1000 parts by weight of toluol and 240 parts of xylol. To this mixed solvent, 420 parts of rubber chloride are added. The rubber chloride being bulky, it is best to add it gradually. During addition, agitation is continued until a uniform liquid composition is obtained. The solution thus obtained has a viscosity of 50 seconds and is usually thinned with more solvent to produce coating compositions to be used by brushing or spraying.

In making a brushing composition, the liquid is first thinned with 240 parts of solvent naphtha in which has been dissolved 104 parts of cumarindene resin. Then 100 parts methoxyethyl oleate are added (23.8 per cent of oleate on rubber chloride by weight). The mixture is stirred until uniformity is obtained and it has a viscosity of 28 seconds. In the form of thin films, it readily dries in about 0.5 hour at ordinary temperatures. Warming expedites removal of the volatile thinners.

The added resin serves to increase the adhesion of the composition to metals, etc., and the oleate plasticizes the rubber chloride, rendering the films formed from it flexible and non-brittle. In lieu of the stated oleate, the other alkoxy aliphatic esters of fatty acids which are liquid and have a relatively high boiling point may be used.

Sometimes, it is desirable to form coating compositions which are somewhat more viscous and which can be applied by roll coating methods to the material to be coated, such as paper or other sheet material. The following example is illustrative of such compositions:

Example 2

For coating paper, 105 parts of rubber chloride are dissolved in a mixture of coal tar hydrocarbons comprising 60 parts of benzol, 180 parts of toluol and 60 parts of xylol; all parts by weight. To this solution, there are added 26 parts of cumar-indene resin and 30 parts of methoxyethyl oleate. This mixture is heated under reflux with agitation until a uniform liquid is obtained. When applied to paper, the coating dries quickly at ordinary temperatures and yields a coated paper which is, in addition to being acid and alkali resistant, also moisture proof. The composition contains 6.5 per cent of the oleate or approximately 28.5 per cent of solvent plasticizer on the rubber chloride by weight; about 7.4 per cent of the oleate being added to the varnish base or rubber chloride solution.

In lieu of the methoxyethyl oleate, other solvent-type plasticizers may be used; for instance, the corresponding stearate. As stated ante, there can ordinarily be added 2 to 10 parts of solvent plasticizer to the rubber chloride varnish and in the above example it may be so varied. The amount of plasticizer should be adjusted in any particular composition so that the final film contains sufficient plasticizer to render the coating non-brittle, but not enough to give permanent tackiness.

Another plasticizer of the solvent type, particularly useful, is butoxyethyl stearate and it may be employed in Examples 1 and 2. It has a somewhat higher boiling point and lower vapor tension than the methoxyethyl oleate and is advantageous in films which in use are subjected to somewhat elevated temperatures.

Other high boiling plasticizers, such as the oleates, palmitates, laurates, stearates and other fatty esters, as stated, may be used.

In all these compositions, the rubber chloride made by the method described in application, Serial No. 62,547 (now Patent 2,148,830), is particularly desirable. It is a standardized material free of unstable by-products, and the viscosity relations of the solutions are satisfactory. But other kinds of rubber chloride may be used. The solvent plasticizers mentioned hereinabove are efficient with any solutions of rubber chloride, including the commercial varieties heretofore available, but they are most efficient with the rubber chloride made in the manner described in said application, Serial No. 62,547, because of its uniformity and homogeneity. By milling, disaggregating, drying and chlorinating as there described, a material is made which is homogeneous and like in character throughout; there are no portions exhibiting different properties towards the solvent plasticizer. It is easier to obtain a uniform coating composition with rubber chloride of such nature. However, as stated, the above-mentioned solvent plasticizers are advantageous with any rubber chloride.

It is found in practice that by the addition of solvent plasticizers of the type described, it is possible to improve varnishes containing the ordinary commercial plasticizers, such as tricresyl phosphate. While it is difficult although not impossible, to make useful preparations with rubber chloride solutions and tricresyl phosphate alone, the presence of one of the solvent plasticizers mentioned markedly improves their homogeneity. Good compositions can be easily made containing a little solvent plasticizer to modify a considerable proportion of tricresyl phosphate. This is economical from the point of cost.

The proportion of the solvent plasticizer used varies with the character of final product desired and also with the individual plasticizers. However, in the case of butyl cellosolve stearate, it is found that 15 per cent added to a solution of rubber chloride in a temporary solvent, such as coal tar oil, after removal of that solvent, yields a rather stiff but non-brittle film capable of resisting repeated bending. By raising the proportion of the stearate from 15 per cent to 25 per cent, a softer film is obtained; these percentages being based upon the rubber chloride itself.

It will be noted that in this rather long list of solvent plasticizers, to which others may be added, some may be characterized as esters containing one or more chlorine atoms substituted for alcoholic groups in polyhydric alcohols. This is true of the above-mentioned esters of glycerine dichlorhydrin, for example, which can properly be considered as esters of mono-hydric derivatives of glycerine, in which two of the alcoholic hydroxyl groups normally present are replaced by chlorine. Others of these solvent plasticizers are esters of alkyl ethers derived from ethylene glycol, in which one of the alcoholic hydroxyl groups normally present is replaced by an ether group. In both of these types of esters, the alcoholic constituent or residue is a mono-hydric derivative of a polyhydric alcohol (glycol or glycerin) and carries at least one substitutent group (halogen or ether) on a carbon atom adjacent to the carbon atom in the ester linkage. Similar bodies in which the ester group and the substituent group are not adjacent, such as ether-esters of symmetrical propylene glycol, while good solvent plasticizers, are not as useful, being less resistant to hydrolysis and other chemical actions than the substances in which the two groups are adjacent.

What is claimed is:

1. In the manufacture of rubber chloride varnishes, the improvement which comprises adding to a solution of rubber chloride in a volatile solvent, a solvent plasticizer capable of dissolving the rubber chloride, said plasticizer being selected from the class of liquid esters of monohydric derivatives of polyhydric alcohols having a substituent on at least one carbon atoms adjacent to the ester group, consisting of esters of glycerine dichlorhydrin containing not more than two esters groups, and mono-basic aliphatic esters of alkyl ethers of ethylene glycol, said plasticizer being added in a proportion insufficient to liquefy the rubber chloride in the dry film obtained by evaporation of the said volatile solvent.

2. The process of claim 1, wherein said solvent plasticizer is added in a proportion from 5 per cent to 30 per cent on the rubber chloride.

3. The process of claim 1, wherein said solvent plasticizer is a chlorinated monobasic aliphatic ester of an alkyl ether of ethylene glycol.

4. The process of claim 1, wherein said solvent plasticizer is an aliphatic ester of glycerin dichlorhydrin.

5. A plastic rubber chloride composition consisting essentially of rubber chloride and a solvent plasticizer therefor, said plasticizer being selected from the class of liquid esters of monohydric derivatives of polyhydric alcohols having a substituent on at least one carbon atom adjacent to the ester group, and consisting of esters of glycerin dichlorhydrin containing not more than two esters groups, and mono-basic aliphatic esters of alkyl ethers of ethylene glycol, said plasticizer being present in an amount from 5 to 30 per cent by weight on the rubber chloride.

6. The composition of claim 5 dissolved in a volatile solvent to form a varnish.

7. As a new composition of matter, a plasticized rubber chloride preparation comprising rubber chloride, a solvent therefor, and from 5 to 30 per cent on the rubber chloride of a high boiling monobasic aliphatic ester of an ether alcohol constituting a miscible chemically inert solvent plasticizer for the composition, and permanent in air; the said ether ester plasticizer being incorporated in the said rubber chloride to form a unitary composition which is thermoplastic after removal of said solvent.

8. The composition of claim 7, wherein said ether ester is butyl cellosolve stearate.

MARGARET R. NORTH.
*Administratrix of the Estate of Clayton Olin North, Deceased.*